United States Patent

Higurashi et al.

[19]

[11] Patent Number: 6,026,213
[45] Date of Patent: *Feb. 15, 2000

[54] DIGITAL SIGNAL RECORDING METHOD AND APPARATUS AND RECORDING MEDIUM THEREFOR

[75] Inventors: Seiji Higurashi, Fuchu; Takeo Ohishi; Mitsuo Harumatsu, both of Yokohama, all of Japan

[73] Assignee: Victor Company of Japan, Ltd., Yokohama, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/623,297

[22] Filed: Mar. 28, 1996

[30] Foreign Application Priority Data

Mar. 28, 1995 [JP] Japan ................................. 7-096179

[51] Int. Cl.[7] .................................................. H04N 5/783
[52] U.S. Cl. ............................................. 386/68; 386/124
[58] Field of Search .................................. 386/68, 80, 81, 386/111, 112, 124, 95, 104; 360/48; H04N 5/783

[56] References Cited

U.S. PATENT DOCUMENTS 5,526,199  6/1996  Seki et al. ................................. 360/48
5,668,677  9/1997  Seki et al. ................................ 386/111
5,684,917  11/1997  Yanagihara et al. ...................... 386/80
5,729,649  3/1998  Lane et al. ................................ 386/68

*Primary Examiner*—Huy Nguyen
*Attorney, Agent, or Firm*—Jacobson, Price, Holman & Stern, PLLC

[57] ABSTRACT

Digital signals are recorded in sequential tracks on a tape-form recording medium. In the case where the digital signals are recorded in accordance with a first recording format, at least first digital signals for normal reproduction are recorded in a single area of the first format on each track. In the case where the digital signals are recorded in accordance with at least a second recording format, at least the first digital signals are recorded in a specific area among divided areas of the second format, the divided areas being rewritable independently on each track, the specific area being common for both the first and second formats. And, second digital signals for special reproduction are recorded in previously determined areas among recording areas on each track, the recording areas being common for both the first and second formats.

5 Claims, 5 Drawing Sheets

DIGITAL SIGNAL RECORDING METHOD AND APPARATUS AND RECORDING MEDIUM THEREFOR

BACKGROUND OF THE INVENTION

The present invention relates to a digital signal recording method and recording apparatus and a recording medium therefor. More specifically this invention relates to a digital signal recording method and apparatus for recording a plurality of different sorts of normal reproduction digital signals and special reproduction digital signals on a tape-form recording medium by use of a rotary head, and a recording medium used for the digital signal recording method and apparatus.

In general, digital signals are recorded in unit of data block on and reproduced from a tape-form recording medium, such as a magnetic tape by use of a rotary head. There is a case that a trick play reproduction (special reproduction) such that digital signals are reproduced at a speed different from the speed at which the digital signals are recorded. The data recorded for the normal reproduction are reproduced discontinuously at certain time intervals in this case. The scanning pattern of the rotary head on the tape-form recording medium is different from that obtained when the digital signals are reproduced in the normal reproduction. It is thus difficult to obtain the trick play reproduction signals without any additional processing.

Therefore, conventionally, there has been known a digital signal recording method for enabling the special reproduction as disclosed in Japanese Patent-Laid Open No. 1994-261278. This teaches that digital signals for the special reproduction are arranged and recorded on tracks on which normal reproduction digital signals are recorded along the rotary head scanning pattern obtained in the special reproduction.

In such a digital signal recording method, the recording format of the digital signals recorded on each track of a tape-form recording medium is kept constant. It is thus impossible to record digital signals of desired systems in various formats (e.g., such a format that a plurality of data areas are arranged on a single track so that digital signals can be recorded and reproduced independently) by use of a signal apparatus.

In addition, there is a case where the digital signals for the normal reproduction and the special reproduction are recorded on the recording medium under mixed conditions. The data rate of the special reproduction digital signals and the arrangement positions of the special reproduction digital signals in this case are different from each other. Because the recording formats of the digital signals are different from each other. There arises a problem in that a circuit for forming the special reproduction digital signals and a circuit for recording the special reproduction digital signals at specific positions on the tape-form recording medium are both complicated in circuit construction.

SUMMARY OF THE INVENTION

With these problems in mind, therefore, it is an object of the present invention to provide a digital signal recording method and apparatus and a recording medium used therefor, by which the normal reproduction digital signals and the special reproduction digital signals can be recorded in accordance with mutually different formats under mixed conditions.

Further, another object of the present invention is to provide a digital signal recording method and apparatus and a recording medium used therefor, by which when the normal reproduction digital signals and the special reproduction digital signals are recorded on a recording medium under mixed conditions, the circuits for forming and recording the special reproduction digital signals can be simplified in circuit construction, in spite of the fact that the recording track format systems are different from each other.

To achieve the above-mentioned object, the present invention provides a method for recording digital signals in sequential tracks on a tape-form recording medium, comprising the steps of: in the case where the digital signals are recorded in accordance with a first recording format, recording at least first digital signals for normal reproduction in a single area of the first format on each track; in the case where the digital signals are recorded in accordance with at least a second recording format, recording at least the first digital signals in a specific area among a plurality of divided areas of the second format, the divided areas being rewritable independently on each track, the specific area being common for both the first and second formats; and recording second digital signals for special reproduction in previously determined areas among recording areas on each track, the recording areas being common for both the first and second formats.

The method may further comprise the steps of: selecting either the first or the second digital signals according to a data rate of the first digital signals; and recording the selected digital signals in the previously determined areas.

The method may further comprise the steps of: detecting the data rate of the first digital signals; and selecting the first digital signals when the detected data rate becomes higher than a predetermined data rate.

Further, the present invention provides an apparatus for recording digital signals in sequential tracks on a tape-form recording medium, comprising: first selecting means for selecting either first digital signals for normal reproduction or second digital signals for special reproduction according to a data rate of the first digital signals; adding means, in the case where the digital signals are recorded in accordance with at least a first recording format, for adding a header indicating at least previously determined areas among recording areas on each track to a data block of the selected digital signals and to auxiliary data to be recorded on an area other than a plurality of divided areas of the first format, the recording areas being common for the first recording format and a second recording format, the divided areas being rewritable independently on each track; second selecting means for selecting the digital signals without the header when the digital signals are recorded in accordance with the second format, whereas selecting the digital signals with the header or the auxiliary data with the header when the digital signals are recorded in accordance with the first format; and recording means, in the case where the digital signals are recorded in accordance with the second format, for recording at least the first digital signals selected by the second selecting means in a single area of the second format on each track, in the case where the digital signals are recorded in accordance with the first format, for recording at least the first digital signals selected by the second selecting means in a specific area among the divided areas of the first format, and for recording the second digital signals selected by the second selecting means in the previously determined areas.

The apparatus may further include detecting means for detecting the data rate of the first digital signals and applying a control signal to the first selecting means when the data rate becomes higher than a predetermined data rate, the first selecting means selecting the first digital signals in response to the control signal.

Further, the present invention provides a method for reproducing digital signals recorded in sequential tracks on a tape-form recording medium, comprising the steps of: reading the digital signals recorded in the sequential tracks on the recording medium; detecting address information included in the read digital signals; reproducing first digital signals for normal reproduction and second digital signals for special reproduction, and auxiliary digital signals on the basis of the detecting address information, each second digital signal having a first, a second, and a third data block aligned in this order, the first and third data blocks storing the same data; selectively outputting the first digital signals or either the first or the second data block of the second digital signals in response to a control signal; and outputting the auxiliary digital signals in response to another control signal.

Further, the present invention provides a tape-form recording medium on which digital signals are recorded in sequential tracks on the recording medium, comprising: a single area on each track for recording at least first digital signals for normal reproduction in accordance with a first recording format; a plurality of divided areas rewritable independently on each track, for recording at least the first digital signals in a specific area among the divided areas in accordance with a second recording format, the specific area being common for both the first and second formats; and a plurality of recording areas on each track for selectively recording the first digital signals and second digital signals for special reproduction accordance with a data rate of the first digital signals, the recording areas being common for both the first and second formats.

In the recording medium, it is preferable that the number of total data blocks recorded in the single area of the first format is equal to a sum total of the number of total data blocks recorded in the divided independently rewritable areas of the second format and the number of data blocks of the areas to be rewritten.

DETAILED DESCRIPTION OF THE PREFERRED EMBODIMENTS

An embodiment of the present invention will be described hereinbelow with reference to the attached drawings.

Figure 1:
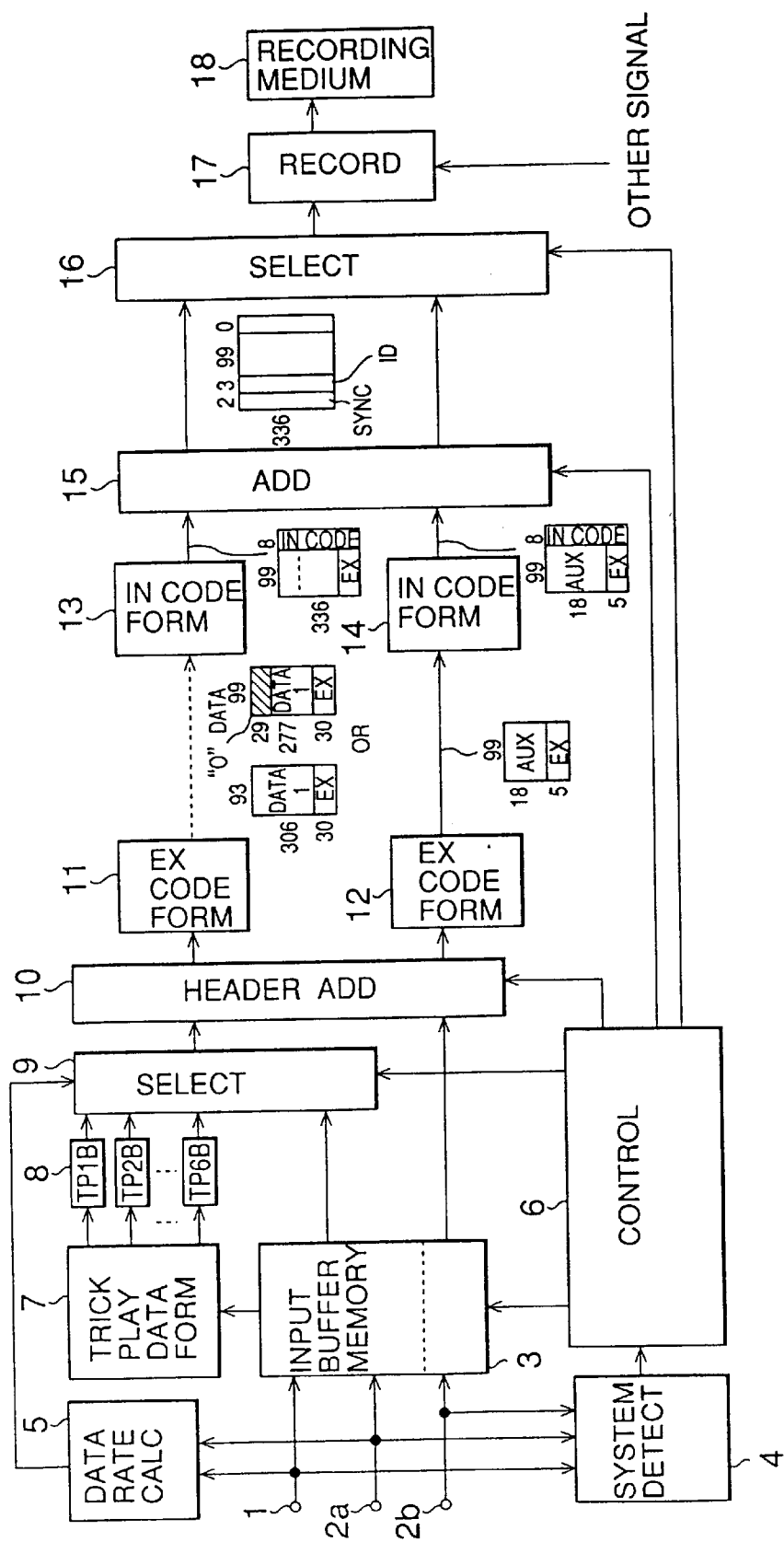
FIG. 1 is a block diagram showing an embodiment of the digital signal recording method and apparatus according to the present invention.

FIG. 1 is a block diagram showing a recording apparatus for assistance in explaining the digital signal recording method and apparatus according to the present invention. In FIG. 1, digital signals for first-system normal reproduction (referred to as the normal reproduction data, hereinafter) to be recorded in a first track format are inputted through an input terminal 1. Second-system normal reproduction data to be recorded in a second track format are inputted through an input terminal 2a. Further, auxiliary data (AUX) to be recorded and reproduced in the second format separately from the second-system normal reproduction data are inputted through an input terminal 2b. These auxiliary data (AUX) are audio signals or other.

Here, in the present embodiment, the digital signals are recorded on tracks formed by a helical scanning type magnetic recording and reproducing apparatus (VTR). In this VTR, digital signals are recorded and reproduced on and from a magnetic tape wound obliquely around an outer circumferential side surface of a rotary body over about an 180-degree angular range thereof. Further, the recording and reproduction are done while the magnetic tape is running at a constant speed, by use of two opposing rotary heads attached to the rotary body 180 degrees away from each other and having two different azimuth angles. Each track is constructed by arranging a plurality of data areas of a constant data rate (referred to as sync blocks) corresponding to the afore-mentioned data blocks in accordance with the scanning operation of the rotary head.

Figure 2:
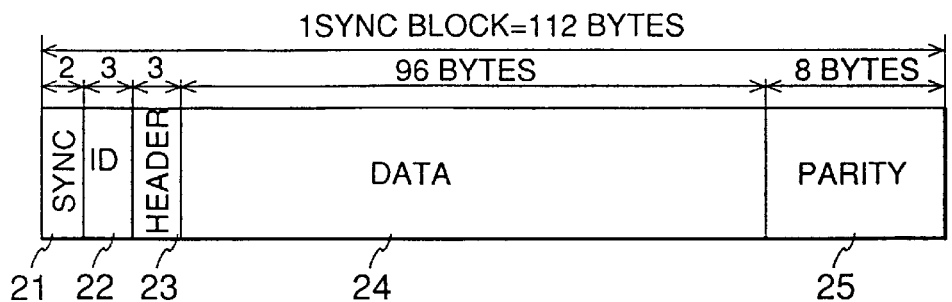
FIG. 2 is an illustration showing an example of data block format formed by the method according to the present invention.

FIG. 2 shows an example of the format of a sync block. As shown, one sync block (i.e., a data block) is a 112-byte area formed by synthesizing, in time series manner, a two-byte synchronizing signal (Sync) area 21 for reproducing the sync block, a three-byte address (ID) area 22, a three-byte header storing area 23 for storing various data, a 96-byte data storing area 24, and an eight-byte parity area 25 for correcting any error of the sync block data.

In this embodiment, for instance, digital signals of a transport packet (TP) transmission system of MPEG2 (Moving Picture Expert Group 2) are recorded in the above-mentioned data storing area 24, as the normal reproduction data or special reproduction data. Further, a single track is formed by synthesizing a plurality of the sync blocks in time series manner.

Figure 3:
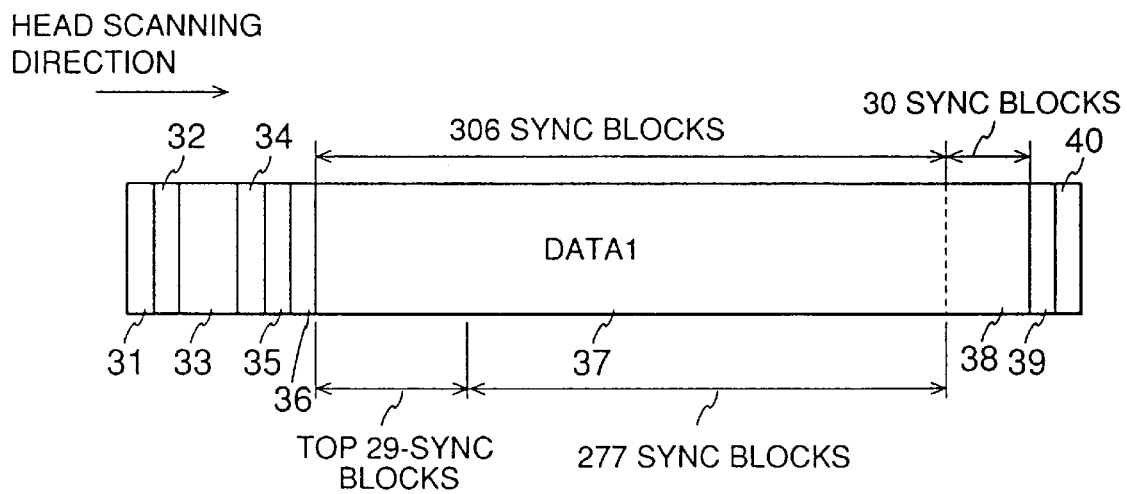
FIG. 3 is an illustration showing an example of a first-system track format formed by the method according to the present invention.

With respect to the track format, in the case of the first system digital signal recording, a first track format as shown in FIG. 3 is formed. Further, in the case of the second system digital signal recording or the auxiliary signal recording, a second track format as shown in FIG. 4 is formed.

The first track format as shown in FIG. 3 is composed of a margin area 31, a pre-amble area 32, a subsidiary code area 33, a post-amble area 34, an IBG (interblock gap) area 35, a pre-amble area 36, a data area 37, an error correction code area 38, a post-amble area 39, and a margin area 40. Here, the data area 37 and the error correction code area 38 constitute a major data area. This data area 37 is composed of 306 sync blocks, in which the first system digital signals (the normal reproduction data or the special reproduction data) DATA1 of 306 sync blocks are recorded. Further, the error correction code area 38 is composed of 30 sync blocks, in which external codes (C3 codes) for correcting errors of the first system digital signals DATA1 are recorded.

Figure 4:
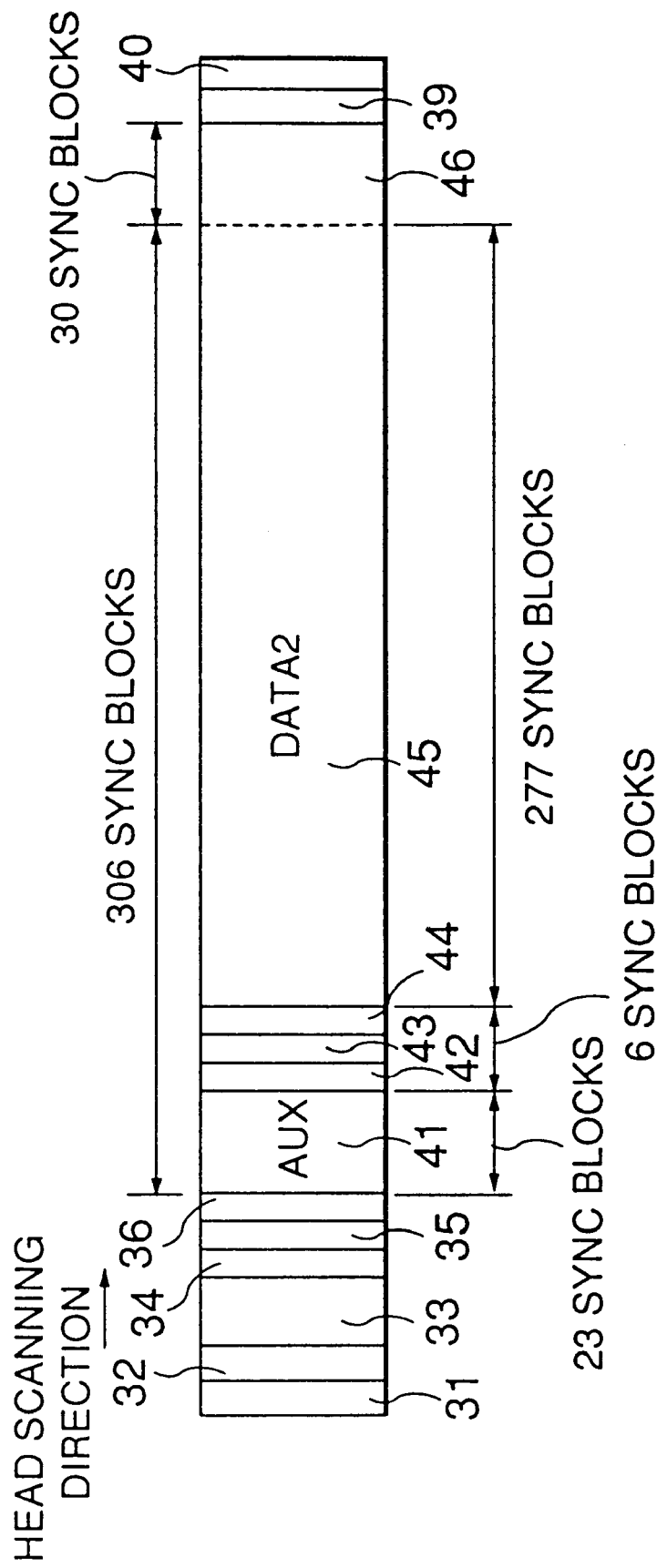
FIG. 4 is an illustration showing an example of a second-system track formed by the method according to the present invention.

Next, the second track format shown in FIG. 4 is used for the second system digital signals and auxiliary signals, in which the same reference numerals have been retained for the same composing areas shown in FIG. 3. The second track format as shown in FIG. 4 is composed of a margin area 31, a pre-amble area 32, a subsidiary code area 33, a post-amble area 34, an IBG area 35, a pre-amble area 36, a first data area 41, a post-amble area 42, an IBG area 43, a pre-amble area 44, a second data area 45, an error correction code area 46, a post-amble area 39, and a margin area 40.

Here, the first data area 41, the post-amble area 42, the IBG area 43, the pre-amble area 44, and the second data area 45 are constructed by 306 sync blocks which is the same as the data area 37 shown in FIG. 3. In the 306 sync blocks, the first data area 41 is composed of 23 sync blocks, in which the auxiliary signals AUX are recorded. Further, the post-amble area 42, the IBG area 43, and the pre-amble area 44 are composed of two sync blocks, three sync blocks, and one sync block, respectively, so as to construct a rewritable edition gap area of six sync blocks as a whole.

Further, in the second data area 45, the second system digital signals (the normal reproduction data or the special reproduction data) DATA2 of 277 sync blocks are recorded. Further, in the error correction code area 46, external codes (C3 codes) for correcting errors of the second system digital signals DATA2 are recorded. In more detail, error correction codes of 30 sync blocks formed for the data of 306 sync blocks in total (an addition of the 277 sync block DATA2 and the 29 sync block "0" data) are recorded in this error correction code area 46.

Returning to FIG. 1 again, when the first system normal reproduction data are inputted through the input terminal 1, the inputted data are written in an input buffer memory 3, and further applied to a system detecting circuit 4 and a data rate calculating circuit 5. The system detecting circuit 4 detects the system of the inputted data. The data rate calculating circuit 5 calculates the data rate of the first system normal reproduction data. Further, when the second system normal reproduction data and the auxiliary signals are inputted through the input terminals 2a and 2b, respectively, the inputted data and the auxiliary signals are written in the input buffer memory 3, and further applied to the system detecting circuit 4. The second system normal reproduction data is also applied to the data rate calculating circuit 5.

In accordance with the detected system, the system detecting circuit 4 applies one-bit detection signal to a control circuit 6. In response to the one-bit detection signal, the control circuit 6 forms and outputs various signals such as a read control signal applied to the input buffer memory 3, a select signal applied to a selecting circuit 9, header data, a synchronizing signal, address data, etc. all applied to a selecting circuit 9.

The data rate detecting circuit 5 calculates the data rate of the inputted normal reproduction data, and compares the calculated data rate with a plurality of previously determined reference values to detect a set data rate range to which the inputted normal reproduction data belongs. The data rate detecting circuit 5 then outputs a select signal according to the detected data rate to the selecting circuit 9.

After having been stored in the input buffer memory 3, the first or second system normal reproduction data are read in response to the read control signal applied by the control circuit 6 and then supplied to a trick play data forming circuit 7 and the selecting circuit 9. Further, when the auxiliary signals are stored in the input buffer memory 3, the auxiliary signals are supplied to a header adding circuit 10.

On the basis of the inputted normal reproduction data, the trick play data forming circuit 7 forms of six sorts of trick playing (special reproduction) data, and multiplexes four-byte additional data (e.g, packet arrival time and other data) with the formed trick playing data as an additional header, respectively. The trick play data forming circuit 7 then outputs the six sorts of data in parallel to write these data in six dedicated buffer memories 8 (TP1B to TP6B), respectively.

More in detail, the trick play data forming circuit 7 decodes the inputted normal reproduction data (MPEG transport stream), takes away some frames of the inputted data in accordance with trick play reproduction speeds, and encodes the data. Instead of that, the trick play data forming circuit 7 may take out packets including independently reproducible blocks in accordance with trick play reproduction speeds. Further, the trick play data forming circuit 7 is not required when data of normal reproduction data and previously formed trick play data being time-division multiplexed with each other via input terminal 1 are distributed to the input buffer memory 3 and buffer memories 8, respectively.

The construction of the same sorts of the special reproduction data is the same in both the cases where the first and second system digital signals are recorded.

The respective data stored in the six buffer memories 8 (TP1B to TP6B) are read on the basis of the read signal applied by the control circuit 6, and then inputted to the selecting circuit 9. The selecting circuit 9 selects any of the normal reproduction data and the six sorts of the special reproduction data TP1 to TP6 on the basis of both select signals applied by the control circuit 6 and the data rate calculating circuit 5. The selecting circuit 9 then supplies the selected data to the header adding circuit 10.

In other words, the selecting circuit 9 selects and outputs any of the normal reproduction data and the six sorts of the special reproduction data TP1 to TP6 in a previously determined specific sequence. Further, when any of the six sorts of the special reproduction digital signals are outputted, any of the special reproduction data and the normal reproduction data are selected and outputted according to the data rate of the normal reproduction data detected by the data rate calculating circuit 5. In this case, as the data rate of the normal reproduction data increases, the normal reproduction data are selected, instead of the special reproduction data (e.g., TP1 to TP6) of a lower priority.

Further, when the special reproduction data TP2 to TP6 are selected and outputted, as described later in further detail, the selecting circuit 9 selects those data in such a way that: a plurality of data blocks of the special reproduction data recorded under overlapped conditions are arranged in both front and rear of a plurality of data blocks of the special reproduction data recorded once without being overlapped.

Figure 5:
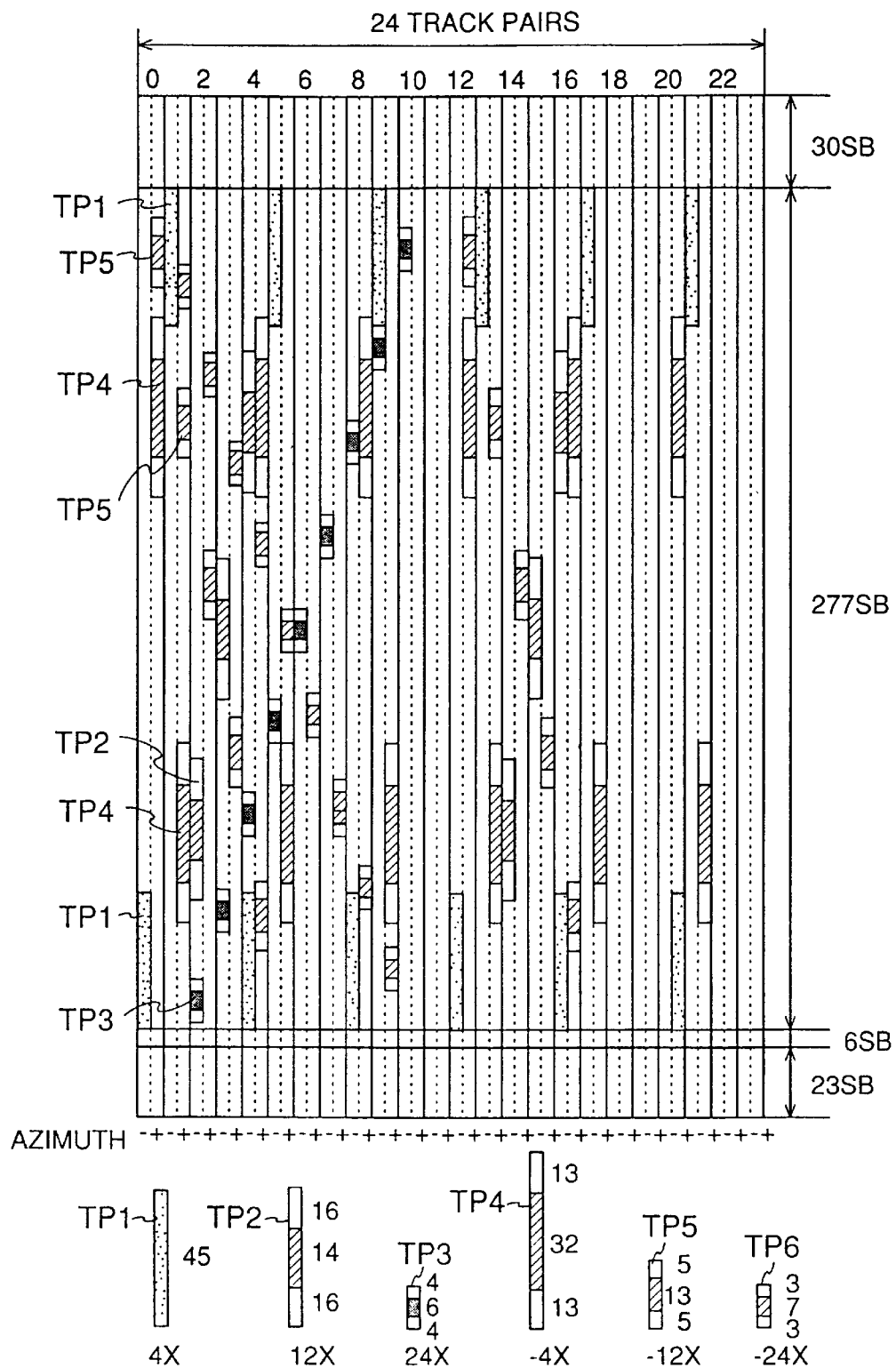
FIG. 5 is an illustration showing a track format of an embodiment of the recording medium according to the present invention.

The normal reproduction data and the special reproduction data TP1 to TP6 or time-series synthesized data formed of parts of these data all outputted by the selecting circuit 9 are supplied to the header adding circuit 10. The header adding circuit 10 adds three-byte header data applied by the control circuit 6 to the head of these data. The header data are stored in the header storing area 23 shown in FIG. 2. In this embodiment, the header data includes at least map data and a discriminate data. The map data indicates a track pattern (e.g., as shown in FIG. 5) in which the six-sorts of special reproduction data TP1 to TP6 are arranged and recorded on a specific area previously determined on the tape-form recording medium 18. The discriminate data discriminates which one of the special reproducing data TP1 to TP6 and the normal reproduction data are selected and recorded on the six-sorts of special reproduction data (TP1 to TP6) recording areas, respectively.

The 99-byte digital signals composed of the header and the normal reproduction data or the special reproduction data both read by the header adding circuit 10 are supplied to an external code forming circuit 11. This external code forming circuit 11 forms 30 sync block external codes as the error correcting codes for the sync block data recorded on one-track data area. The sync block data are 306 sync block data stored in the data area 37 shown in FIG. 3 in the case of the first system. Or, the sync block data are 277 sync block data stored in the data area 45 shown in FIG. 4 in the case of the second system.

In the second system, the external code forming circuit 11 forms an external code for 306 (in total) sync block data obtained by adding the 277 sync block input digital signals and 29 sync block "0" data corresponding to 29 sync blocks of the data area 41, the post-amble area 42, the IBG area 43, and the pre-amble area 44 shown in FIG. 4. The external code is stored in the error correcting code area 38 shown in FIG. 3 in the case of the first system digital signals. Or, the external code is stored in the error correcting code area 46 shown in FIG. 4 in the case of the second system digital signals.

The digital signals composed of the header, the digital data and the external codes formed by the external code forming circuit 11 are supplied to an internal code forming circuit 13. The internal code forming circuit 13 forms an eight-byte parity as an internal code in unit of 99 bytes. Further, the header and the auxiliary data (AUX) read by the header adding circuit 10 are inputted to another external code forming circuit 12. The external code forming circuit 12 forms 5 sync block external codes for each 18 sync blocks. The auxiliary data of 23 sync blocks are supplied to another internal code forming circuit 14, to form an eight-byte parity as an internal code in unit of 99 bytes.

The digital signals of data, a header, external codes, and internal codes formed by the internal code forming circuits 13 and 14 are supplied to an adder circuit 15. The adder circuit 15 forms sync blocks by adding the two-byte synchronizing signal as shown by Sync and the three-byte address data as shown by ID both in FIG. 2 to the supplied digital signals. After that, the digital signals are supplied to another selecting circuit 16 in unit of sync blocks. When the first system normal reproduction data are inputted through the input terminal 1, in response to the select signal applied by the control circuit 6, the selecting circuit 16 selects the sync blocks including the first system normal reproduction data or the special reproduction data. These are the data inputted through the internal code forming circuit 13 and the adder circuit 15, respectively. On the other hand, when the second system normal reproduction data and the auxiliary data (AUX) are inputted through the input terminals 2a and 2b, respectively, in response to the select signal applied by the control circuit 6, the selecting circuit 16 selects the sync blocks including the second system normal reproduction data or the special reproduction data or the auxiliary data (AUX). These are the data inputted through the internal code forming circuit 13 and 14 and the adder circuit 15, respectively.

The output signals of the selecting circuit 16 are multiplexed with a pre-amble signal, a subsidiary code signal, a post-amble signal, etc., to be recorded in the areas 32, 33, 34, 39, 42, 44, etc. shown in FIGS. 3 and 4. The multiplexed data are then modulated and amplified by a signal recording circuit 17. Further, the modulated and amplified signals are recorded on the recording medium 18 (a magnetic tape, in this embodiment) by a recording mechanism using a well-known rotary head (not shown). As described above, the normal reproduction data and the special reproduction data TP1 to TP6 can be recorded by forming the track pattern as shown in FIG. 5. Further, the normal reproduction data are recorded, instead of a part or all of the special reproduction data TP1 to TP6, according to the data rate of the normal reproduction data.

Further, in the case where the second system digital signals are recorded, only one of the second system normal reproduction data inputted through the input terminal 2a and the auxiliary data (AUX) inputted through the input terminal 2b can be recorded independently.

The track pattern of an embodiment of the recording medium according to the present invention will be described hereinbelow with reference to FIG. 5. FIG. 5 shows 24 pairs of tracks (i.e., 48 tracks) recorded by a first rotary head having a positive azimuth angle and a second rotary head having a negative azimuth angle. Further, each track shows the 336 sync blocks composed of the 306 sync block data area 37 and the 30 sync block error correcting code area 38 both shown in FIG. 3. Or, each track shows the 336 sync blocks composed of the data areas from the first data area 41 to the error correcting code area 46 shown in FIG. 4.

As understood by FIG. 5, the special reproduction data TP1 to TP6 are arranged and recorded at previously determined specific positions. The recording ranges are set to the second data area 45 of 277 sync blocks (excluding the first data area 41 of 23 sync blocks and the editing gap of six sync blocks composed of the areas 42 to 44). Also in the case of recording the first system digital signals, the special reproduction data TP1 to TP6 are recorded at a part of the 277 sync block range excluding the 29 head sync blocks from the data area 37 of 306 sync blocks shown in FIG. 3.

In this embodiment shown in FIG. 5, various data are recorded at previously determined specific positions, respectively. These various data are the first special reproduction data TP1 of four-time (4×) speed in the forward direction, the second special reproduction data TP2 of 12-time (12×) speed in the forward direction, the third special reproduction data TP3 of 24-time (24×) speed in the forward direction, the fourth special reproduction data TP4 of four-time (−4×) speed in the reverse direction, the fifth special reproduction data TP5 of 12-time (−12×) speed in the reverse direction, and the six special reproduction data TP4 of 24-time (−24×) speed in the reverse direction.

Here, the first special reproduction data TP1 are composed of 45 sync blocks; the second special reproduction data TP2 are composed of 46 sync blocks; the third special reproduction data TP3 are composed of 14 sync blocks; the fourth special reproduction data TP4 are composed of 58 sync blocks; the fifth special reproduction data TP5 are composed of 23 sync blocks; and the six special reproduction data TP6 are composed of 13 sync blocks, respectively. The block lengths of these special reproduction data are set in such a way that the data can be reproduced even if the rotary head scanning is slightly shifted from the predetermined pattern in the trick playing operation.

Further, in FIG. 5, the portions where the special reproduction data TP1 to TP6 are not recorded indicate the track portions where the normal reproduction data are recorded. In addition, two white portions between which each special reproduction data TP2 to TP6 is sandwiched are sync blocks where the same data are recorded.

Table 1 lists the number of sync blocks, the recording data rate, the reproducing data rate, etc. of the respective special reproduction data on the track pattern shown in FIG. 5. In Table 1, SB is an abbreviation of sync block, and the number of sync blocks are calculated on the condition that one SB is 94 bytes on an average.

TABLE 1

| SP R | B U-RST/SCN | S-B(a)/SCN | S-B(b)/SCN | REC SB/TPF | REP SB/SCN | REC D-RT kbps | REP D-RT kbps |
|---|---|---|---|---|---|---|---|
| +4 | 2 | 45 | 0 | 90 | 90 | 507.6 | 2.03 |
| +12 | 3 | 14 | 16 | 138 | 90 | 259.44 | 2.03 |
| +24 | 9 | 6 | 4 | 126 | 90 | 118.44 | 2.03 |
| −4 | 2 | 32 | 13 | 116 | 90 | 654.24 | 2.03 |
| −12 | 5 | 13 | 5 | 115 | 90 | 216.2 | 2.03 |
| −24 | 9 | 7 | 3 | 117 | 90 | 109.98 | 2.03 |

(SP R: a speed ratio; SCN: scanning; REC: recording; REP: reproduction; and D-RT: data rate)

Further, SB(a) denotes the number of sync blocks in which data is recorded once in the special reproduction data blocks; SB(b) denotes the number of sync blocks in which the same data are recorded twice in the special reproduction data blocks; and TPF implies trick play frame; and SCN implies one revolution of a rotary body (e.g., a rotary drum).

When all the six sorts of special reproduction data TP1 to TP6 are recorded as shown in FIG. 5 in accordance with Table 1, the ratio of all the special reproduction data rate to all the recorded data rate (60×306 (SB/s)) is 13.5%. This is because all the special reproduction data are recorded at a speed of 2481.25 SB per second. In this case, the recordable data rate of the normal reproduction data is 11.9 Mbps.

The embodiment is described under the condition that the data rate of the normal reproduction data is changed. And, the recorded data rate of the special reproduction data is reduced when the data rate of the normal reproduction data becomes higher than 11.9 Mbs. In this case, during reproduction, the special reproduction data TP1 to TP6 are reduced beginning from the lower priority order in sequence.

In the embodiment, the priority order of the 24-time speed special reproduction data TP3 and TP6 is the lowest priority. Further the priority increases in the order of the reverse-direction four-time speed special reproduction data TP4, the forward-direction four-time special reproduction data TP1, the reverse-direction 12-time speed special reproduction data TP5, the forward-direction 12-time special reproduction data TP2. Then, as the data rate of the normal reproduction data increases beyond 11.9 Mbps, the special reproduction data recording is omitted in the order of (1)TP3 and TP6, (2)TP4, (3)TP1, (4)TP5, (5)TP2. Further, finally, all the special reproduction data recordings are omitted, and only the normal reproduction data are recorded.

Table 2 lists the recorded special reproduction data, the proportion occupied by the special reproduction data, and the data rate of the recordable normal reproduction data.

TABLE 2

| RECORDED SPL DATA | RATIO OCCUPIED BY SPL DATA (%) | RECORDABLE NOR DATA RATE (Mbps) |
|---|---|---|
| NONE | 0 | 13.8 |
| TP2 | 1.9 | 13.5 |
| TP2, TP5 | 3.4 | 13.3 |
| TP2, TP5, TP1 | 7.1 | 12.8 |
| TP2, TP5, TP1, TP4 | 11.9 | 12.2 |
| TP2, TP5, TP1, TP4, TP3, TP6 | 13.5 | 11.9 |

In the above Table 2, the recordable and reproducible normal reproduction data rate is the data rate of the first-system normal reproduction data recorded by the first format. Therefore, the second-system normal reproduction data recorded by the second format becomes smaller than these listed values by about 1.31 Mbps (=(23+6) SB/track ×60 track/s ×94 byte/SB ×8 bit/byte).

In the present embodiment, in both the cases where the first-system digital signals and the second-system digital systems are recorded, the data rate required for the special reproduction data TP1 to TP6 is the same as far as the same sort of the special reproduction data are recorded. It is thus possible to use the trick play data forming circuit 7 for forming the special reproduction data in common for both the first and second system digital signals. This results in the forming circuit being simplified to that extent.

Further, in the present embodiment, in both the cases where the first-system digital signals and the second-system digital signals are recorded, the recording positions where the special reproduction data TP1 to TP6 are recorded are fixedly determined as shown in FIG. 5. It is thus possible to simplify the function required for the circuit for arranging and recording the special reproduction data TP1 to TP6 on the track to that extent.

Figure 6:
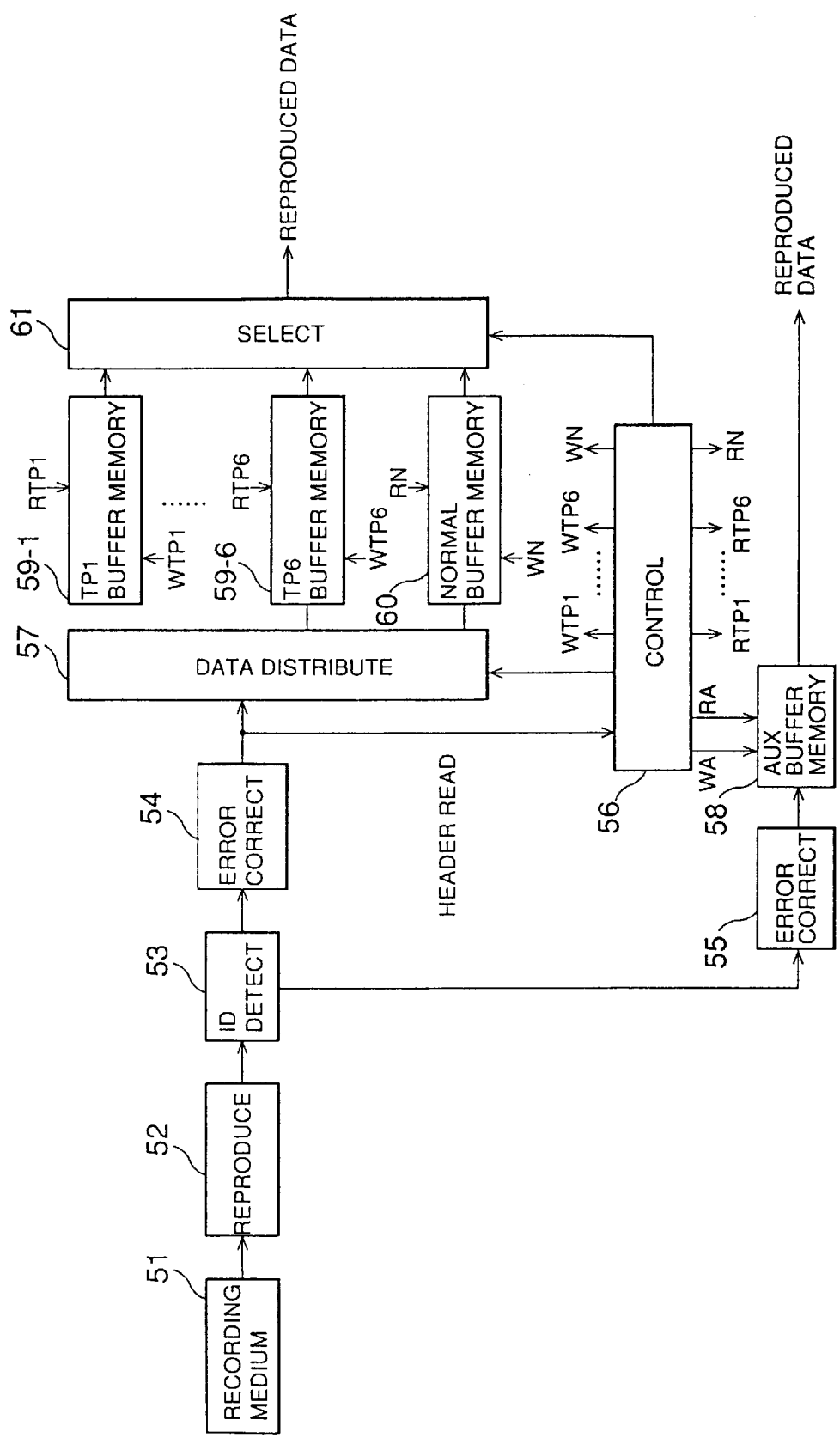
FIG. 6 is a block diagram showing an embodiment of the digital signal reproducing apparatus according to the present invention.

Now, the construction and operation of the digital signal reproducing apparatus for reproducing the recording medium according to the present invention will be described hereinbelow with reference to FIG. 6.

A recording medium 51 is the same as the recording medium 18 shown in FIG. 1, which is formed with a track pattern as shown in FIG. 5. After having been reproduced by use of a well-known reproducing mechanism (including the rotary head), the reproduced digital signals are amplified and demodulated by a signal reproducing circuit 52. And then the demodulated signals are applied to an ID detecting circuit 53 to detect the address data (ID). On the basis of the ID detected by the ID detecting circuit 53, the digital signals stored in the data area 37 and the error correction code area 38 shown in FIG. 3 are supplied to an error correcting circuit 54. Further, On the basis of the ID, the digital signals stored in the data area 45 and the error correction code area 46 shown in FIG. 4 are also supplied to the error correcting circuit 54. On the other hand, the reproduced digital data (AUX) stored in the data area 41 shown in FIG. 4 are supplied to another error correcting circuit 55.

The reproduced digital signals error-corrected by the error correcting circuit 54 are supplied to a control circuit 56 and further to a data distributing circuit 57. Further, the reproduced digital signals error-corrected by the error correcting circuit 55 are supplied to an AUX buffer memory 58.

The control circuit 56 analyzes the header of the reproduced digital signals and outputs a control signal to the data distributing circuit 57. Further, the control circuit 56 generates write control signals WTP1 to WTP6, WN and WA applied to buffer memories 59-1 to 59-6, a normal buffer memory 60 and an AUX buffer memory 58, respectively. In addition, the control circuit 56 analyzes the four-byte additional data (additional header) of the reproduced digital signals to detect the data arrival time, and generates read-out control signals RTP1 to RTP6 and RN and RA, so that all the data can be read at the same timing.

On the basis of the control signals, when the inputted reproduced digital signals are of the special reproduction data TP1 to TP6, the data distributing circuit 57 distributes the reproduced digital signals to each of the dedicated buffer memory 59-1 to 59-6. Further, when the inputted reproduced digital signals are of the normal reproduction data, the data distributing circuit 57 supplies the reproduced digital signals to the normal buffer memory 60. In the case of the special reproduction data TP2 to TP6, only one of the two places (the white portions in FIG. 5) where the same data blocks of the special reproduction data are recorded is selected and outputted. Therefore, even if the head scanning is slightly shifted away from the predetermined pattern, it is possible to reproduce the special reproduction data under excellent conditions.

The special reproduction data TP1 to TP6 stored in the buffer memories 59-1 to 59-6, respectively, and the normal reproduction data stored in the buffer memory 60 are read on the basis of read control signals RTP1 to RTP6 and RN. And the read signals are inputted to a selecting circuit 61. The selecting circuit 61 selects one sort of data designated by the control circuit 56 and outputs the selected data as the reproduction data. On the other hand, when the auxiliary data (AUX) are reproduced, the control circuit 56 supplies a read control signal RA to the AUX buffer memory 58 that outputs the reproduced auxiliary data.

Further, the present invention is not limited only to the above-mentioned description. For instance, the present embodiment has been explained by taking the case where digital signals are recorded and reproduced in accordance with any one of the two-system formats. However, the present invention can be applied to the case of three or more system formats by recording the special reproduction data at a part of the area common for all the systems.

Further, in the above-mentioned embodiment, any one of the first system and the second system is decided automatically by the system detecting circuit 4. Without being limited only thereto, the system can be of course decided manually. Further, in the above-mentioned embodiment, the special reproduction data are formed on the basis of the normal reproduction data. It is also possible to form and input the special reproduction data separately from the normal reproduction data.

As described above, in the digital signal recording method and apparatus according to the present invention, the same area for recording the special reproduction digital signals are used in common for both the first and second format recordings. It is thus possible to use the circuit for arranging and recording the special reproduction digital signals on the tracks in common for each format recording. This results in the simplified circuit construction.

Further, in the digital signal recording method and apparatus according to the present invention, the special reproduction digital signals are recorded in the same construction in both the first and second format recordings. Further, the data rate of the special reproduction digital signals is equalized in both the first and second format recordings. It is thus possible to use the circuit for forming the special digital signals in common for each format recording. This results in the simplified circuit construction.

Further, in the digital signal recording method and apparatus according to the present invention, any of the special reproduction digital signals and the normal reproduction digital signals are selected and recorded at the recording area for the special reproduction digital signals, according to the data rate of the normal reproduction digital signals. It is thus possible to eliminate the switching of the circuits (for addressing) for arranging the special reproduction digital signals. This results in the circuit function being reduced markedly.

Further, in the recording medium according to the present invention, the special reproduction digital signals (instead of the normal reproduction digital signals) are recorded in a specific area previously determined in the digital signal recording area used in common for both the first and second formats on the respective tracks. It is thus possible to reproduce the special reproduction digital signals from the same area in any format reproduction by the reproducing apparatus.

We claim:

1. An apparatus for recording digital signals in sequential tracks on a tape-form recording medium, comprising:

first selecting means for selecting either first digital signals for normal reproduction or second digital signals for special reproduction according to a data rate of the first digital signals;

adding means, in the case where the digital signals are recorded in accordance with at least a first recording format, for adding a header indicating at least previously determined areas among recording areas on each track to a data block of the selected digital signals and to auxiliary data to be recorded on an area other than a plurality of divided areas of the first format, the recording areas being common for the first recording format and a second recording format, the divided areas being rewritable independently on each track;

second selecting means for selecting the digital signals without the header when the digital signals are recorded in accordance with the second format, whereas selecting the digital signals with the header or the auxiliary data with the header when the digital signals are recorded in accordance with the first format; and recording means, in the case where the digital signals are recorded in accordance with the second format, for recording at least the first digital signals selected by the second selecting means in a single area of the second format on each track, in the case where the digital signals are recorded in accordance with the first format, for recording at least the first digital signals selected by the second selecting means in a specific area among the divided areas of the first format, and for recording the second digital signals selected by the second selecting means in the previously determined areas.

2. The apparatus according to claim 1, further comprising detecting means for detecting the data rate of the first digital signals and applying a control signal to the first selecting means when the data rate becomes higher than a predetermined data rate, the first selecting means selecting the first digital signals in response to the control signal.

3. A method for reproducing digital signals recorded in accordance with a first or a second recording format in sequential tracks on a tape-form recording medium, comprising the steps of:

reading the digital signals recorded in the sequential tracks on the recording medium, the digital signals recorded on which are auxiliary digital signals, in the case where the digital signals have been recorded in accordance with the first recording format, first digital signals for normal reproduction and second digital signals for special reproduction in a first area on each track, and in the case where the digital signals have been recorded in accordance with the second recording format, the first and the second digital signals in a second area that corresponds to a part of the first area on each track, the second digital signals for special reproduction having been recorded in the identical areas in the first and the second areas;

detecting address information included in the read digital signals;

reproducing the first digital signals for normal reproduction and the second digital signals for special reproduction, and the auxiliary digital signals on the basis of the detecting address information, each of said second digital signals having a first, a second, and a third data block aligned in this order, the first and third data blocks storing the same data;

selectively outputting the first digital signals or either the first or the second data block of the second digital signals in response to a control signal; and outputting the auxiliary digital signals in response to another control signal.

4. A method for recording digital signals in sequential tracks on a tape-form recording medium, comprising:

selecting either first digital signals for normal reproduction or second digital signals for special reproduction according to a data rate of the first digital signals;

adding, in the case where the digital signals are recorded in accordance with at least a first recording format, a header indicating at least previously determined areas among recording areas on each track to a data block of the selected digital signals and to auxiliary data to be recorded on an area other than a plurality of divided areas of the first format, the recording areas being common for the first recording format and a second recording format, the divided areas being rewritable independently on each track;

selecting the digital signals without the header when the digital signals are recorded in accordance with the second format, otherwise selecting the digital signals with the header or the auxiliary data with the header when the digital signals are recorded in accordance with the first format; and recording, in the case where the digital signals are recorded in accordance with the second format, at least the first digital signals selected by the step of selecting the digital signals in a signal area of the second format on each track, otherwise recording, in the case where the digital signals are recorded in accordance with the first format, at least the first digital signals selected by the step of selecting the digital signals in a specific area among the divided areas of the first format, and recording the second digital signals selected by the step of selecting the digital signals in the previously determined areas.

5. The method according to claim 4, further comprising detecting the data rate of the first digital signals, wherein the step of selecting the first or second digital signals selects the first digital signals when the data rate becomes higher than a predetermined data rate.

* * * * *